United States Patent [19]
Smith et al.

[11] Patent Number: 5,767,780
[45] Date of Patent: Jun. 16, 1998

[54] DETECTOR FOR FLOW ABNORMALITIES IN GASEOUS DIFFUSION PLANT COMPRESSORS

[75] Inventors: Stephen F. Smith, Loudon; Kim N. Castleberry, Harriman, both of Tenn.

[73] Assignee: Lockheed Martin Energy Research Corporation, Oakridge, Tenn.

[21] Appl. No.: 551,984

[22] Filed: Nov. 2, 1995

Related U.S. Application Data

[63] Continuation of Ser. No. 124,775, Sep. 22, 1993, abandoned.

[51] Int. Cl.⁶ .................................................. G08B 21/00
[52] U.S. Cl. ......................... 340/648; 340/635; 340/661; 324/772
[58] Field of Search .................... 340/648, 635, 340/661; 324/76.19, 76.21, 772; 318/85, 139

[56] References Cited

U.S. PATENT DOCUMENTS

| | | | |
|---|---|---|---|
| 3,197,755 | 7/1965 | Conger | 340/635 |
| 4,123,009 | 10/1978 | Kilpinen | 364/494 |
| 4,305,028 | 12/1981 | Kostas et al. | 340/648 |
| 4,523,286 | 6/1985 | Koga et al. | 241/30 |
| 4,703,259 | 10/1987 | Berliner et al. | 340/661 |
| 4,829,234 | 5/1989 | Gretsen | 340/648 |
| 4,965,513 | 10/1990 | Haynes et al. | 324/158 |
| 4,978,909 | 12/1990 | Hendrix et al. | 324/76.19 |
| 5,229,651 | 7/1993 | Baxter et al. | 340/661 |
| 5,289,166 | 2/1994 | Cohen | 340/661 |

*Primary Examiner*—Jeffery Hofsass
*Assistant Examiner*—Julie B. Lieu
*Attorney, Agent, or Firm*—Morgan & Finnegan

[57] ABSTRACT

A detector detects a flow abnormality in a plant compressor which outputs a motor current signal. The detector includes a demodulator/lowpass filter demodulating and filtering the motor current signal producing a demodulated signal, and first, second, third and fourth bandpass filters connected to the demodulator/lowpass filter, and filtering the demodulated signal in accordance with first, second, third and fourth bandpass frequencies generating first, second, third and fourth filtered signals having first, second, third and fourth amplitudes. The detector also includes first, second, third and fourth amplitude detectors connected to the first, second, third and fourth bandpass filters respectively, and detecting the first, second, third and fourth amplitudes, and first and second adders connected to the first and fourth amplitude detectors and the second and third amplitude detectors respectively, and adding the first and fourth amplitudes and the second and third amplitudes respectively generating first and second added signals. Finally, the detector includes a comparator, connected to the first and second adders, and comparing the first and second added signals and detecting the abnormal condition in the plant compressor when the second added signal exceeds the first added signal by a predetermined value.

29 Claims, 3 Drawing Sheets

DETECTOR FOR FLOW ABNORMALITIES IN GASEOUS DIFFUSION PLANT COMPRESSORS

This is a continuation of application Ser. No. 08/124,775, filed on Sep. 22, 1993, now abandoned.

This invention was made with government support under Contract No. DE-AC05-84OR21400 awarded by the U.S. Department of Energy to Martin Marietta Energy Systems, Inc. and the government has certain rights in this invention.

FIELD OF THE INVENTION

The present invention relates to a detector for detecting operational conditions in an axial flow machine, such as, a detector for determining flow abnormalities in gaseous diffusion plant compressors. More particularly, the invention relates to a detector which compares a target frequency band, which is characteristic of the detectable abnormality, to a reference frequency band, and indicates an incipient condition when the ratio of the target to the reference bands reaches a threshold value.

BACKGROUND OF THE INVENTION

For many years, the longevity of gaseous diffusion plant (GDP) compressors (both centrifugal and axial-flow types) has been a major concern due to the large expense incurred in lost production and machine rebuilding following a compressor failure. The use of motor current signature analysis (CSA) has been shown to be useful in the diagnosis of conditions such as rotor imbalance, coupling misalignment, compressor cavitation, surging or rotating stall, fan and pump drive-belt damage, and other problems not in the past thought to be observable by examination of the motor current. In addition, many load-related problems have been found to be more easily detectable using CSA than with any other single sensor.

Typically, the plant process compressors include 0, 00 and 000 size axial compressors, operating at nominal power levels of 750 hp, 1700 hp and 3300 hp, respectively. These compressors are usually arranged in groups of ten or what is commonly known as a cell. The plant process compressors can suffer severe blading damage, and often total failure as a result of surging or other adverse flow conditions. Early detection of the anomalies can prevent or minimize compressor failure, lost production and equipment repair expense.

Gaseous diffusion plant (GDP) compressors which are subjected to various system restrictions may be driven to the surge point where the operation of the compressor becomes unstable. This instability typically is one of two forms, surge or rotating stall, and both of these conditions involve the existence of what is commonly called the secondary operating characteristic of the compressor. Surge is a large amplitude oscillation of the flow through the compressor which involves repeatedly moving the instantaneous operating point of the compressor from the primary to the secondary operating characteristic and back. Surge is typically easy to detect due to the resulting motor ammeter fluctuations and a distinctive sound made by the compressor.

On the other hand, rotating stall is much more subtle and is characterized by the formation of a bubble-shaped region of recirculating gas that rotates within the compressor. This region, which is usually called a stall cell, effectively blocks a portion of the cross-sectional area of the compressor and results in a decrease in both efficiency and compression ratio. In many industrial systems, when a compressor moves into rotating stall, the compressor will generally remain in this condition until the compressor fails or until operator intervention restores normal system flow in the compressor.

Rotating stall is suspected to be the primary anomaly causing most 00 process compressors to fail because it can go undetected for days at a time. The length of time that a compressor can operate in a rotating stall varies with operating power, but usually within a few days the cumulative stress will deblade the compressor. When a compressor does fail, the entire cell or group of ten compressors must be bypassed, taken off line and shut down, sometimes for several weeks, to allow the damaged components to be repaired or replaced. In addition to the incurred maintenance costs, there are also losses in both cascade efficiency and separative work capacity. For example, the 00 process compressors operate at speeds just under 1800 rpm and when in the rotating stall condition, these compressors (as well as other axial machines) produce mechanical load modulations of roughly 43% of normal rotational frequency, or in this case, about 13 Hz. Depending on the specific 00 compressor blading configuration, the rotating stall frequency has been observed to vary from approximately 12 Hz to nearly 14 Hz. Since rotating stall results from operating the compressor under secondary operating characteristics, rotating stall is sometimes referred to as "secondary stable" operation or simply "secondary" operation.

Secondary operation increases the risk of compressor failure by increasing vibration levels which increase blade temperatures and other internal mechanical stresses in the compressor. The amplitude of vibratory stress in the blades during secondary operation can be five times the level that incurs during normal operation. Over time, the resulting mechanical stresses can fatigue internal parts, especially blades, and result in compressor failure. Although secondary operation can, over a period of time, deblade a compressor, secondary operation can be easily missed or mistaken as a normal condition especially in an area where there are many compressors to monitor. Unusual sounds that a compressor might make as a result of secondary operation are often masked by the noise from surrounding equipment. A low compression ratio, which is characteristic of secondary operation, is not a foolproof indicator because it can also result from operation on a low compression-ratio part of the normal operating curve.

It is known to monitor motor current and analyze certain characteristics thereof to determine motor operating conditions. For example, U.S. Pat. No. 4,123,009 to Kilpinen discloses a device which can determine load in a grinding mill by monitoring motor current. A selected frequency band, corresponding to an incipient rod-tangle condition, is filtered out of the current signal.

U.S. Pat. No. 4,965,513 to Haynes et al. describes a current signature analysis used to identify various operating conditions by correlating peak frequencies to a particular condition.

U.S. Pat. No. 4,978,909 to Hendrix et al. describes another motor current signature analysis technique in which amplitude demodulation and phase demodulation circuits are used with a frequency analyzer correlate to operating conditions.

While the techniques described in the aforementioned U.S. patents are useful in identifying certain machine operating conditions, they do not provide for automated evaluation of machine-related signals. Furthermore, some conditions may produce confusing signals that might lead to misinterpretation and false identification. In particular, a machine operating in a typical industrial environment may produce a motor current signal with unrelated noise components.

SUMMARY OF THE INVENTION

An object of the present invention is to provide a detector for determining secondary operation as well as other flow abnormalities in a compressor such as a gaseous diffusion plant compressor.

Another object of the present invention is to provide a detector which will reliably sense flow abnormalities in the presence of large wideband flow noise signals.

Another object of the present invention is to provide a detector which is capable of automatically compensating for normal fluctuations in plant process power levels.

Still another object of the present invention is to prevent or minimize compressor failures, compressor down-time and compressor equipment repair expenses by identifying incipient, failure-causing machine operating conditions.

These and other objects of the invention are met by providing an apparatus for detecting a selected operating condition in a machine which includes means for producing a voltage signal which varies in accordance with machine operation, means for excluding from the voltage signal substantially all frequencies except those within a target frequency band which is characteristic of the selected operating condition, means for excluding from the voltage signal substantially all frequencies except at least one reference frequency band, means for comparing the voltage signal in the target frequency band to the voltage signal in the reference frequency band, and means for outputting a signal when a difference between the target and reference voltage signals exceed a threshold value.

These together with other objects and advantages which will be subsequently apparent, reside in the details of construction and operation as more fully hereinafter described and claimed, with reference being had to the accompanying drawings forming a part hereof, wherein like numerals refer to like elements throughout.

DETAILED DESCRIPTION OF THE PREFERRED EMBODIMENTS

Figures 1, 2:
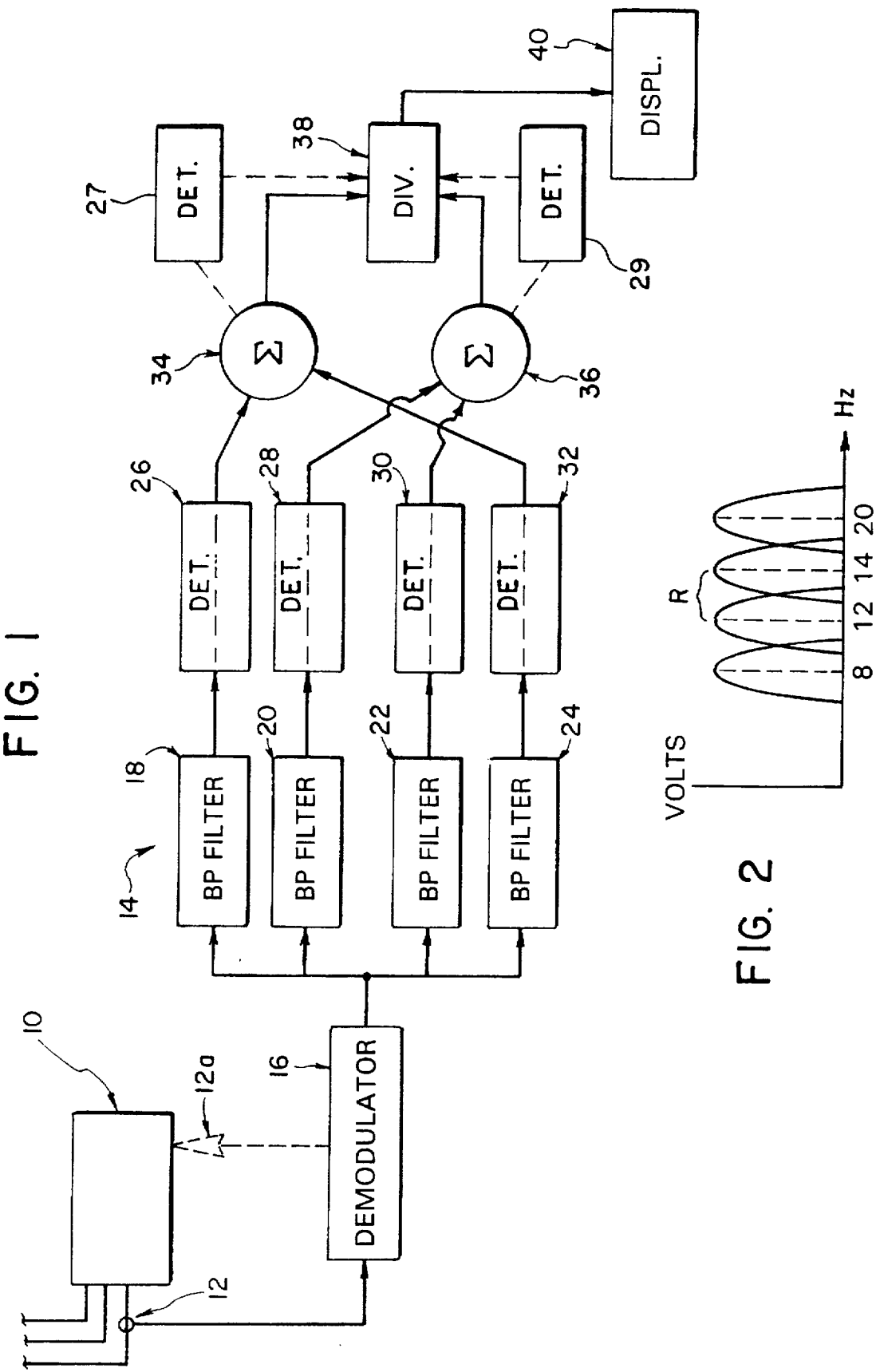
FIG. 1 is a schematic diagram of an apparatus according to a first, preferred embodiment of the present invention.
FIG. 2 is a diagram showing the frequency response of the four bandpass filters illustrated in FIG. 1.

Referring to FIG. 1, a machine 10 produces various signals which vary in accordance with operation of the machine. For example, if the machine 10 is a compressor driven by an electric motor, the power supply of the motor can be monitored for motor current with conventional pick-up means, such as a clamp-on current transformer 12. The motor current signal from the transformer 12 is fed to a detector 14 for determining machine operating conditions.

In the illustrated embodiment, the motor current signal produced by the transformer 12 is fed to a demodulator and lowpass filter 16, which may AM, PM or FM demodulate the incoming signal. Examples of AM demodulators include envelope detectors, peak detectors, RMS detectors, and synchronous detectors. The lowpass filter component is intended to remove high frequencies such as those at or above 120 Hz.

The demodulated signal is then fed to four bandpass (BP) filters 18, 20, 22 and 24. In the case where the operating condition is rotating stall which occurs at 13 Hz in a given compressor, the filters are selected to have frequency responses approximately as shown in FIG. 1(a). Bandpass filter 18 has a peak center frequency of 8 Hz, while bandpass filters 20, 22 and 24 have peak center frequencies of 12, 14 and 20 Hz, respectively. When in a rotating stall condition, the 00 model compressor operating at 1,800 rpm produces mechanical load modulations of roughly 43% of normal rotational frequency, or about 13 Hz. Since different 00 machine blading configurations produce rotating stall frequencies between roughly 12 and 14 Hz, a range "R" of frequencies is to be detected between the peak center frequencies of the middle two filters 20 and 22.

The outputs of the bandpass filters 18, 20, 22 and 24 are amplitude detected by detectors (DET.) 26, 28, 30 and 32, respectively. The detectors may be A.C. to D.C. converters such as averaging rectifiers or other similar devices. The outputs of the two filters 20 and 22 are then summed by an adder 34, and the outputs of the filters 18 and 24 are summed by an adder 36. A ratio between the outputs of the adders 34 and 36 is provided by a divider 38, whose output is a signal indicative of the monitored condition. Alternatively, as shown in broken lines in FIG. 1, the outputs of filters 18 and 24 can be passed directly to the adder 34 and then amplitude detected by detector 27. Similarly, the outputs of filters 20 and 22 can be passed directly to the adder 36 and then amplitude detected by detector 29. Divider 38 then determines the ratio of the outputs of the detectors 27 and 29.

The two sum-signals represent the signal levels in bands corresponding to filters 18, 24 and 20, 22, respectively. For the circuit output to be active (meaning a valid signal exists within the central range of bands in filters 20 and 22), the energy in the range of 12 to 14 Hz must exceed a level which is itself dependent on the energy in bands 18 and 24. This prevents false triggering of the system when a large background level occurs across the entire sensing bandwidth. In other words, energy in bands 20 and 22, $V_b$, must be substantially greater than the energy in bands 18 and 24, $V_a$, typically by a predetermined ratio. A wideband noise level increase will therefore not trigger the circuit's output, but a well defined peak in bands 20 and 22 significantly above the background level (represented by bands 18 and 24) will. Thus, if $V_b/V_a$, exceeds the desired ratio, a valid output will result, thus reliably sensing the desired components in the presence of large wideband flow noise signals.

The ratio can be calculated by a divider 38 or comparator which, when the predetermined ratio is exceeded, an output signal is delivered to an appropriate location. For example, the signal can be delivered to a display 40. The display may be a warning light in a control room where an operator can take appropriate action to avoid the detected machine condition or incipient condition. The typical ratio in GDP compressors may be in the range of 2:1.

The two center filters 20 and 22 provide a target band which includes the desired frequency or frequencies indicative of an incipient condition. The other two filters 18 and 24 provide a reference frequency band, preferably adjacent to the target range, so that the apparatus detects relative changes between the target and the reference. In many instances, such as in primary surge, the entire spectrum may shift up or down by an amount sufficient to produce false indications of rotating stall. Comparison of the target to the reference prevents the false indication.

As few as two filters may be employed instead of the four illustrated in the preferred embodiment. The only requirement is that the filters provide an adequate target and reference. More than four may be used, and in fact, the only limitation on the number of filters is practicality.

Figure 3:
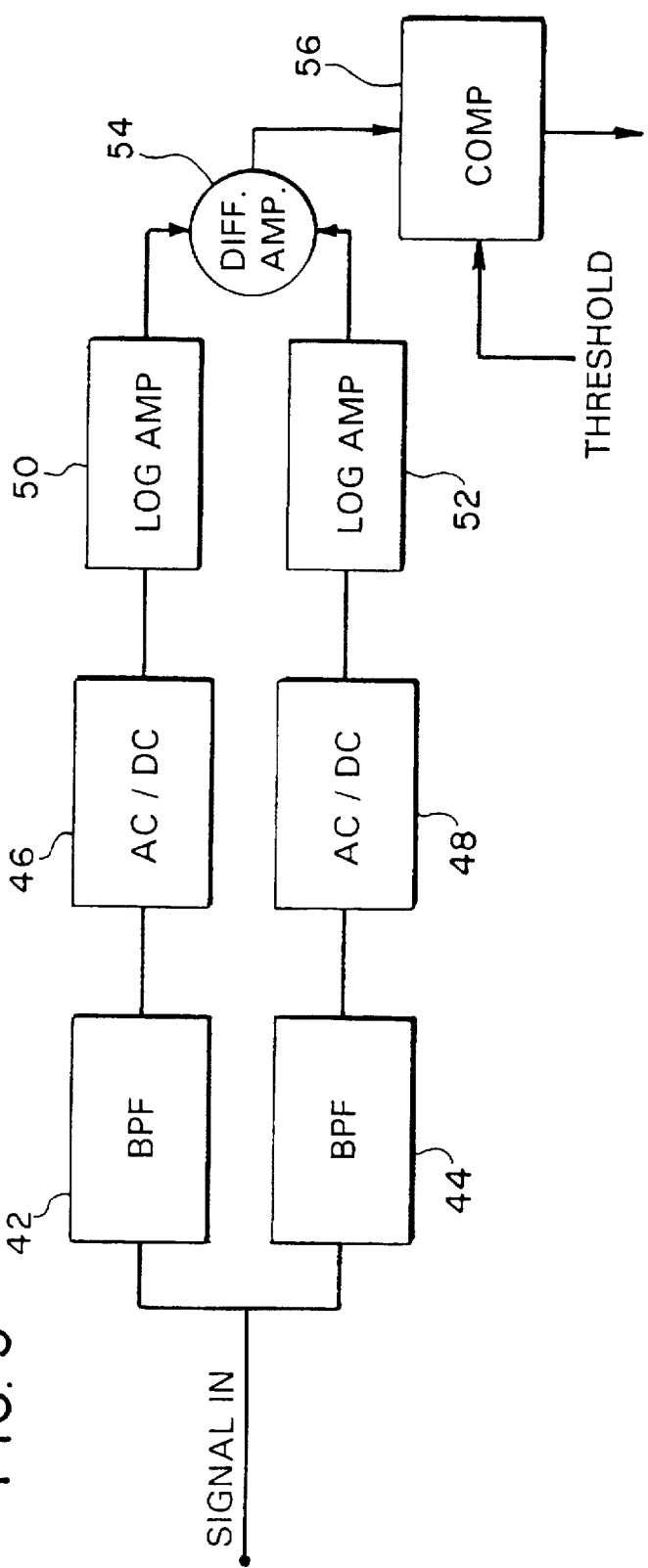
FIG. 3 is a block diagram of the circuit construction of a second embodiment of the present invention.

In the embodiment of FIG. 3, a signal indicative of machine operation, which could be a motor current signal, an accelerometer signal, etc., is fed to two bandpass filter (BPF) banks 42 and 44, preferably after demodulation and lowpass filtering as in the FIG. 1 embodiment. Bandpass filter bank 42 passes the target frequency band, and may include one or more filters. Bandpass filter bank 44 passes the reference frequency band, and may also include one or more filters.

The output of each bandpass bank is fed respectively to AC/DC converters 46 and 48, which convert the alternating current signals to direct current signals. Preferably, the converters are full-wave rectifiers. The converted signals are then fed to logarithmic amplifiers (LOG AMP) 50 and 52, respectively. The outputs of the two logarithmic amplifiers are then fed to a differencing amplifier (DIFF AMP) 54, which delivers an output signal to a comparator (COMP) 56. The comparator 56 compares the signal from the differencing amplifier 54 to a threshold value.

The threshold value is selected to minimize false indications of the selected abnormality monitored by the apparatus, such as rotating stall. The threshold has the same effect of establishing a ratio of target to reference values, as in the embodiment of FIG. 1. When the threshold is exceeded, the comparator outputs a signal which is indicative of the monitored condition. This output signal can be delivered to a display. Depending on the type of machinery involved, the output signal may be delivered to a control circuit for automatically correcting the detected abnormality, or for automatically shutting down the machine.

Figure 4:
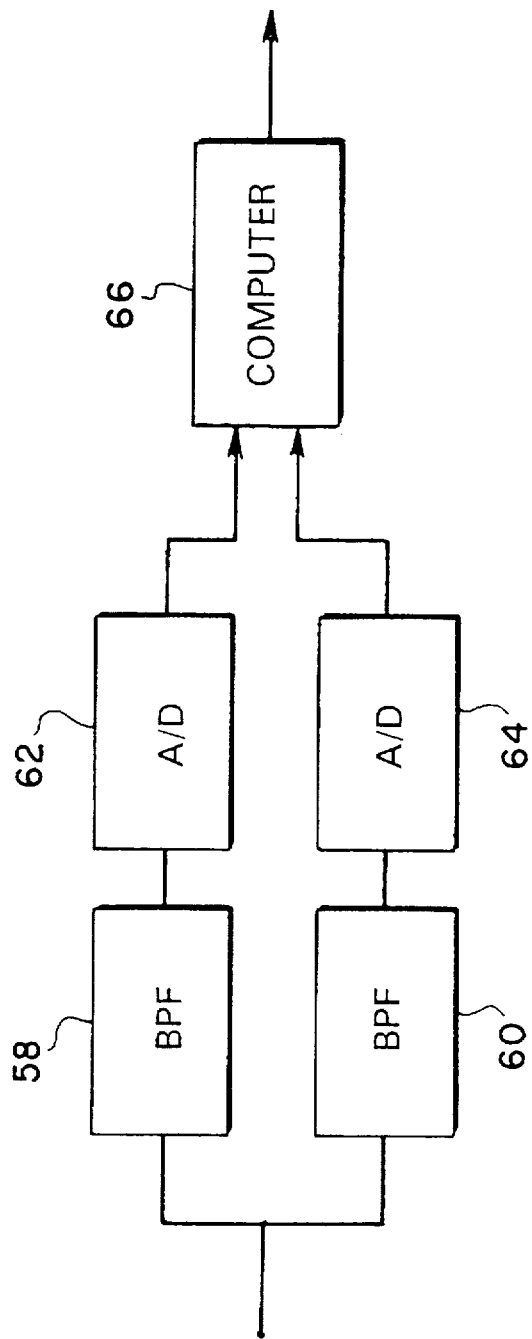
FIG. 4 is a block diagram of the circuit construction of a third embodiment of the present invention.

In the embodiment of FIG. 4, the output signals of two bandpass filter (BPF) banks 58 and 60 are delivered respectively to analog-to-digital (A/D) converters 62 and 64. The digitized signals are then delivered to a computer 66 or other digital signal processor capable of digitally comparing the values obtained in the two separate bandpass filter banks 58 and 60. When the target frequency band of bandpass filter bank 58 exceeds the reference frequency band of bandpass filter bank 60, programmed action is taken. This analysis can be accomplished by using non-linear averaging in the computer software, for example.

Figure 5:
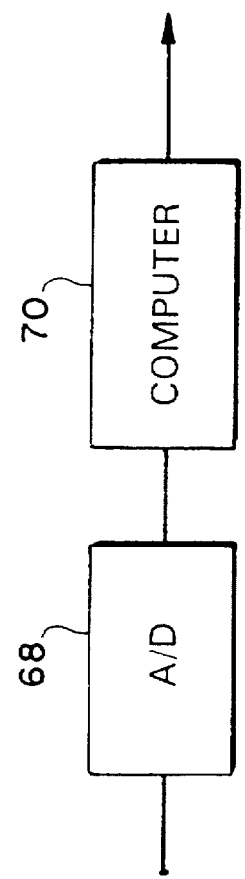
FIG. 5 is a block diagram of the circuit construction of a fourth embodiment of the present invention.

In FIG. 5, the function of the bandpass filters can be undertaken directly by digital signal processing. First, the signal is digitized using an analog-to-digital (A/D) converter 68. The digitized signal is then delivered to a computer 70 for digital signal processing. The computer can be programmed to perform a transform of the signal, such as a generalized frequency transform, a discrete Fourier transform, or a fast Fourier transform (FFT), all of which are capable of providing the appropriate comparison of target to reference frequency bands. Also, specialized digital filtering employing mathematical algorithms can be used. In the embodiment of FIG. 5, all functions including the bandpass filtering, are done digitally by the software, which can easily be programmed to perform the desired operations.

When using computers to effect signal analysis, a multiplexer can be used to monitor a plurality of machines simultaneously.

In one specific computerized system, the demodulated motor current signal is sampled periodically. In the case of a particular gaseous diffusion plant compressor of the 00 type, sampling takes about 5 seconds. The sample data is processed digitally to calculate the fast Fourier transform. The transform is then examined for evidence of a significant component between 12.5 and 13.25 Hz, and compared with the background levels both immediately below and above the target frequency band. If the ratio of these band energies exceeds a programmable threshold, the compressor is re-sampled and checked again. The component at roughly 13 Hz must be found in two successive sample windows before the system will alarm and indicate secondary operating condition for the compressor.

During scanning and sampling the system graphically displays a screen of information in one of several formats. The display selection is operator-controlled and can show status information for all monitored machines in a plant or the Fourier transform or time-data plot from the previously sampled stage. The system software will occasionally adjust the gain of a particular channel to optimize the signal level into the analog to digital (A/D) converter. These gain changes will be reflected, as needed, in the display scale.

Figure 6:
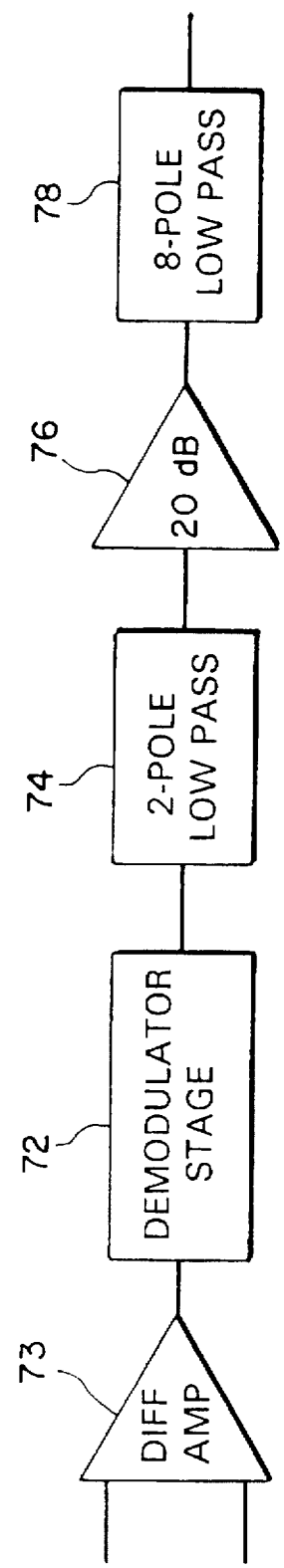
FIG. 6 is a block diagram of a demodulator/lowpass filter suitable for use in the embodiments of FIGS. 1–5.

Commercially available computer equipment can be used in the embodiments using digital signal processing. For example, the monitor can use a 20 MHz, 386-type personal computer installed in a central control room. The front-end signal-processing electronics includes a special in-line AM demodulator as shown in FIG. 6. A demodulator 72, such as a rectifier, receives the signal of a differential amplifier 73, and is connected to a two-pole, 30 Hz lowpass filter 74. The filter 74 attenuates the dominant 120-Hz output signal and feeds a 20-dB gain stage 76. This stage 76 precedes an integrated circuit switched-capacitor filter 78, configured as an 8-pole, 30 Hz lowpass unit. The interposition of the filter 74 pushes the spurious signals from the filter 78 down into the noise floor and provides a satisfactory output signal.

The signal leaving the filter 78 is sampled by a 12-bit A/D converter. In just over five seconds, 512 samples can be taken at a rate of 100 samples per seconds under the control of the computer. Timing of the sample interval is provided by a timer board in the system, which interrupts the computer every 10 milliseconds.

When demodulating a carrier of frequency $f_c$, the bandwidth of the extracted modulation can cover a maximum frequency range of $f_c/2$ without experiencing potentially serious frequency aliasing. Therefore, for a 60-Hz carrier only the band from 0 to 30 Hz is normally examined after demodulation. A 60-Hz sample rate would, according to Nyquist theory, provide the necessary sample timing to recover up to 30 Hz, but in practice for windowed sampling the sample rate should be 2.5 to 3 times the desired maximum frequency. The 100-Hz rate was chosen as a convenient figure that satisfies this criterion. Calculation of a floating-point Fourier transform from the sampled data can be done by the computer. The speed of calculation can be increased to a few milliseconds by passing the sample data to a digital signal processing board, such as a TMS320C30 board made by Sonitech Inc., and allowing it to calculate the transform. The transform yields a 256-point magnitude array covering a 50-Hz band, but only the lower 30 Hz of the transform data is actually used.

The transformer 12 described with reference to the FIG. 1 embodiment is preferably an ac current transformer of known construction. However, for all of the disclosed embodiments, any suitable transducer which produces a signal which varies in accordance with machine operation could be used. Other examples include a resistor and a Hall-Effect transducer.

The machine 10 was described as an electric motor-driven compressor of comparatively large horsepower. While this is one particular application of the present invention, other types of machines may be monitored, including non-electric ones such as a jet engine. In that case, an accelerometer 12a (FIG. 1) could be used to produce a variable voltage signal based on vibration rather than motor current. Other signal generators may be used such as, but not limited to, tachometers, electromagnetic or optical detectors, velocity probes, displacement sensors, and speed sensors.

Generally, the present invention is expected to achieve the best results when monitoring axial flow machines, although centrifugal and reciprocating compressors or other types of pumps are capable of employing the invention. It is expected that various conditions can be detected, including flow normalities as well as flow abnormalities, instabilities, loss of load, cavitation, and abnormal physical conditions including bearing wear, compressor blade rub, shaft wobble and/or imbalances, etc. Other types of machines potentially monitored include refrigeration systems, machine tools and other motor-driven hardware, including valves and mills. Large machines found in waste-water plants, fuel-processing plants, chemical processing plants, and others, can use the present invention.

While the preferred embodiment includes means for determining a ratio, a differencing circuit (such as a subtractor) could be employed to produce the desired comparison of the signals in the target and reference frequency bands.

While advantageous embodiments have been chosen to illustrate the invention, it will be understood by those skilled in the art that various changes and modifications can be made therein without departing from the scope of the invention as defined in the appended claims.

What is claimed is:

1. An apparatus for detecting a selected operating condition in a machine comprising:
    means for producing a current signal which varies in accordance with machine operation, the current signal including a spectrum of frequencies;
    first means for measuring the energy level within a target frequency band of the current signal spectrum, the target frequency band being characteristic of the selected operating condition;
    second means for measuring the energy level within at least one reference frequency band of the current signal spectrum, the reference frequency band being adjacent the target frequency band; and
    means for determining when a ratio of the energy in the target frequency band to the energy in the reference frequency band exceeds a threshold value.

2. An apparatus according to claim 1, wherein the at least one reference frequency band includes a first reference frequency band which is below the target frequency band and a second reference frequency band which is above the target frequency band.

3. An apparatus according to claim 1, wherein the means for producing the signal comprises a transducer.

4. An apparatus according to claim 3, wherein the transducer is one of an ac current transformer, a resistor, and a Hall-Effect transducer.

5. An apparatus according to claim 1, further comprising demodulator means for demodulating the signal prior to excluding the target frequency band and the reference frequency band.

6. An apparatus according to claim 5, wherein the demodulator means includes filter means for filtering from the demodulated signal at least some spurious frequencies not in the reference frequency band and the target frequency band.

7. An apparatus according to claim 1, wherein the first and second measuring means comprise first and second filter means for defining respectively a frequency response band which corresponds to the target frequency band and a frequency response band which corresponds to the reference frequency band.

8. An apparatus according to claim 7, wherein the first filter means comprises first and second bandpass filters, each having a peak frequency response, the target frequency band being defined by the peak frequency responses of the first and second bandpass filters, and the second filter means comprises third and fourth bandpass filters, the third bandpass filter having a peak frequency response below the target frequency band and the fourth bandpass filter having a peak frequency response above the target frequency band.

9. An apparatus according to claim 8, further comprising a demodulator disposed between the signal producing means and the first, second, third and fourth bandpass filters.

10. An apparatus according to claim 9, further comprising first, second, third and fourth amplitude detectors respectively coupled to the first, second, third and fourth bandpass filters.

11. An apparatus according to claim 10, wherein the determining means includes first summing means for adding outputs of the first and second amplitude detectors, second summing means for adding outputs of the third and fourth amplitude detectors, and divider means for providing a ratio between outputs of the first and second summer means.

12. An apparatus according to claim 11, wherein the first, second, third and fourth amplitude detectors comprise first, second, third, and fourth averaging rectifiers, respectively.

13. An apparatus according to claim 8, wherein the determining means includes first summing means for adding outputs of the first and second bandpass filters, second summing means for adding outputs of the third and fourth bandpass filters, a first amplitude detector coupled to the first summing means, a second amplitude detector coupled to the second summing means, and divider means for providing a ratio between outputs of the first and second amplitude detector means.

14. An apparatus according to claim 13, wherein the amplitude detectors are ac to dc converters.

15. An apparatus according to claim 1, wherein the first and second means for excluding from the signal comprise respectively first and second filter banks, each filter bank comprising a plurality of filters connected in parallel and each filter bank outputting an alternating current signal.

16. An apparatus according to claim 15, further comprising first and second A.C. to D.C. converters respectively connected to the outputs of the first and second filter banks, and first and second logarithmic amplifiers connected to the outputs of the first and second A.C. to D.C. converters.

17. An apparatus according to claim 16, wherein the determining means includes a differencing amplifier, receiving output signals of the first and second logarithmic amplifiers, and outputting a signal indicative of the difference between the target frequency band and the reference frequency band.

18. An apparatus according to claim 17, wherein the determining means comprises a comparator coupled to the output of the differencing amplifier and having a predetermined threshold value.

19. An apparatus according to claim 15, further comprising first and second analog-to-digital converters respectively connected to the outputs of the first and second filter banks, and digital processing means, for receiving digitized output signals of the first and second analog-to-digital converters and determining when a ratio between the first and second digitized signals exceeds a threshold value.

20. An apparatus according to claim 1, further comprising an analog-to-digital converter operable to digitize the signal, and the first and second measuring means and the determining means includes a digital signal processor.

21. A method for detecting a selected operating condition in a machine comprising the steps of:
  producing a current signal which varies in accordance with machine operation, the current signal including a spectrum of frequencies;
  measuring the energy level within a target frequency band of the current signal spectrum, the target frequency band being characteristic of the selected operating condition;
  measuring the energy level within at least one reference frequency band of the current signal spectrum, the reference frequency band being adjacent the target frequency band; and
  determining when a ratio of the energy in the target frequency band to the energy in the reference frequency band exceeds a threshold value.

22. A method according to claim 21, wherein the machine is driven b y an electric motor, and the step of producing a signal comprises producing a motor current signal whose voltage varies in accordance with machine operation.

23. A method according to claim 22, further comprising demodulating and filtering the motor current signal prior to the measuring steps.

24. A method according to claim 23, wherein the first measuring step comprises feeding the voltage signal to first and second bandpass filters after demodulating and filtering, the first and second bandpass filters defining a frequency response band which corresponds to the target frequency band.

25. A method according to claim 24, wherein the second measuring step comprises feeding the voltage signal to third and fourth bandpass filters connected after demodulating and filtering, the third and fourth bandpass filters defining a frequency response band which corresponds to the reference frequency band.

26. A method according to claim 21, further comprising digitizing the signal and digitally processing the digitized signal to form the target and reference frequency bands.

27. A method according to claim 26, wherein the digitally processing includes performing a transform on the digitized signal.

28. A method according to claim 27, wherein the transform is one of a generalized frequency transform, a discrete Fourier transform, and a fast Fourier transform.

29. An apparatus for detecting a selected operating condition in a machine comprising:
  means for producing a current signal which varies in accordance with machine operation, the current signal including a spectrum of frequencies;
  first means for measuring the energy level within a target frequency band of the current signal spectrum, the target frequency band being characteristic of the selected operating condition;
  second means for measuring the energy level within at least one reference frequency band of the current signal spectrum, the reference frequency band being adjacent the target frequency band; and
  means for determining when a difference between the energy in the target frequency band to the energy in the reference frequency band exceeds a threshold value.

* * * * *